April 9, 1957 L. E. ERICKSON 2,788,054
COLLAPSIBLE BABY WALKERS
Filed Nov. 8, 1955
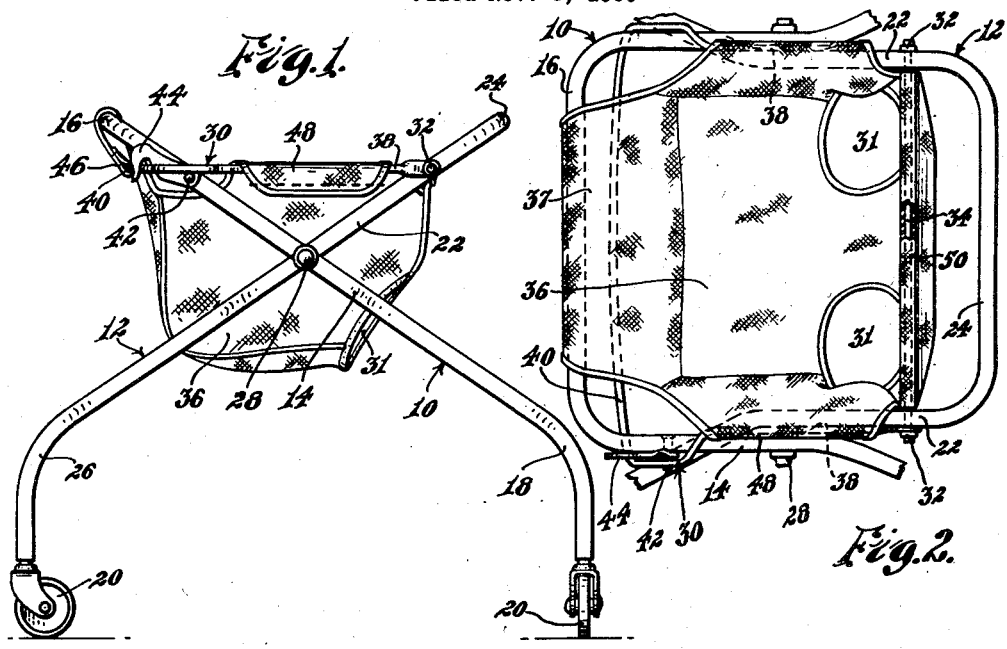
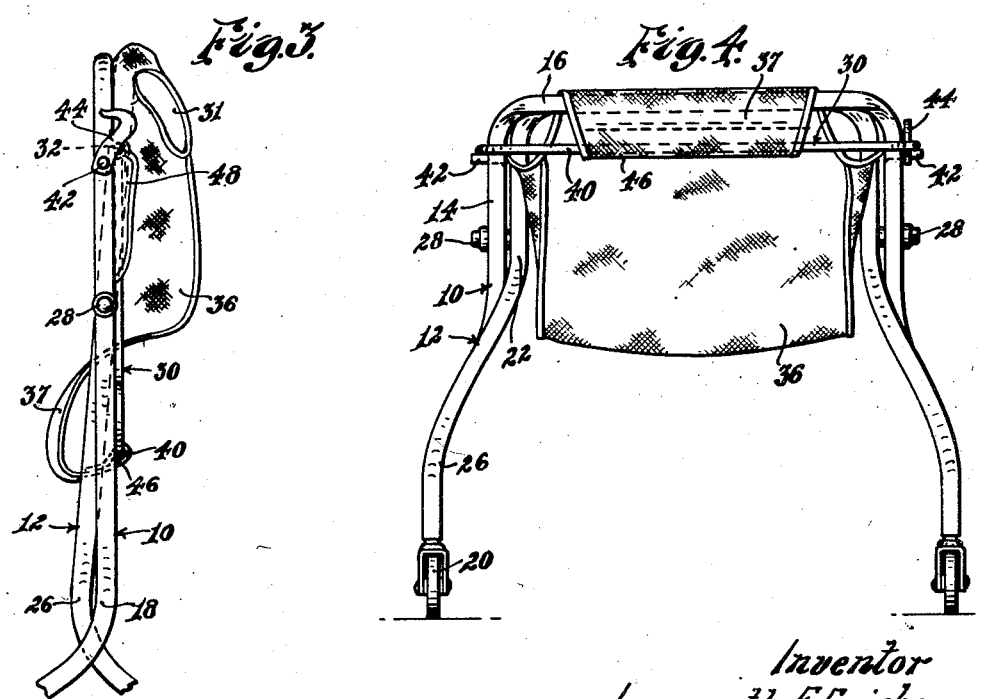
Inventor
Lennarth E. Erickson
By *[signature]*
Attorney.

United States Patent Office 2,788,054
Patented Apr. 9, 1957

2,788,054

COLLAPSIBLE BABY WALKERS

Lennarth E. Erickson, Fitchburg, Mass., assignor to S. & E. Manufacturing Company, Fitchburg, Mass., a corporation of Massachusetts Application November 8, 1955, Serial No. 545,712

4 Claims. (Cl. 155—24)

This invention relates to improvements in baby walkers and the like. More particularly the invention provides an improved collapsible baby walker which is readily convertible from open condition to a generally flat collapsed condition in which it may be conveniently and easily carried, and stored in a small space, as well as compactly packaged for shipment.

It is among the objects of the invention to provide a baby walker, or comparable device, wherein a seat made of flexible sheet material is mounted on one of a pair of frame elements which are readily movable relatively between positions in which they effectively support the seat, and a baby therein, and positions in which they extend in general parallelism in collapsed condition.

Another object of the invention is to provide a baby walker wherein a pair of coacting frame members are pivotally connected together and a third frame member is pivotally mounted on one of the first mentioned frame members and is swingable into and out of restraining relation to the other of the first mentioned frame members, and wherein a seat of flexible sheet material is secured to said third frame member and only one of the first mentioned frame members but becomes engaged and supported by the other of the first mentioned frame members when said third frame member is in restraining relation thereto.

A further object of the invention is to provide a baby walker, or the like, wherein a pair of pivotally connected frame members are movable between an operative spread condition and a collapsed generally flat condition, and wherein a third frame member is pivotally mounted on one of said pair of members and swingable into restraining relation to the other of said pair of members, and wherein a seat of flexible sheet material is connected to only two of the frame members but is adapted to be engaged and supported by all three frame members when said third frame member is in its said restraining position.

It is, moreover, my purpose and object generally to improve the structure and operative efficiency of baby walkers, and the like, and especially baby walkers which may be collapsed to a generally flat condition.

In the accompanying drawing:

Fig. 1 is a side elevation of a baby walker embodying features of the invention;

Fig. 2 is a top plan view of the baby walker of Fig. 1, with portions of the supporting legs broken away;

Fig. 3 is a side elevation showing the baby walker of Figs. 1 and 2 in collapsed condition; and Fig. 4 is a rear end elevation of the baby walker of Figs. 1–3.

Referring to the drawing, two frame members are indicated generally at 10 and 12. Member 10 has generally inverted U shape with the generally straight and parallel leg portions 14 joined together by bridging portion 16. The end part of each leg portion 14 is bent or otherwise curved at 18, and the extremity of each leg portion 14 is equipped with a wheel or caster 20.

Member 12 is similarly formed with the generally straight and parallel leg portions 22 which are joined together by bridging portion 24. Each leg portion 22 has a bent or otherwise curving end part 26 whose extremity is equipped with a wheel or caster 20. However, the spread of the leg portions 22 of member 12 is somewhat less than the spread of leg portions 14 of member 10, so that the leg portions 22 may be arranged between leg portions 14, and the adjacent leg portions 14, 22 are pivotally connected together at each side of the frame, as at 28.

A generally U-shape element 30 has each of its ends pivotally connected at 32 to a different one of the leg portions 22 of frame member 12, the pivotal connections being on opposite projecting ends of a rod 34 which extends transversely between and through the two leg portions 22, with a nut or other abutment element on each end of rod 34, maintaining the rod and the ends of element 30 in assembled condition.

A baby seat 36, of flexible sheet material, is connected to rod 34 and to the opposite legs 38, 38, and bridging part 40, of element 30, so that the flexible seat 36 moves with element 30 when the latter said element is swung on pivot 32 about the axis of rod 34. The length of the legs 38, 38 of element 30 is such that the bridging part 40 of element 30 may be swung over the bridging portion 16 of frame element 10 when the frame elements 10, 12 are in substantially less than their fully spread condition of Fig. 1. A pin 42, or the like, projects outwardly from each leg portion 14 of frame element 10, for engaging under the opposite legs 38, 38 of element 30 and constituting stops for limiting the spreading of frame elements 10, 12, in conjunction with the bridging part 40 of element 30 which engages under the leg portions 14, 14 of frame element 10 when the frame elements 10, 12 are in their fully spread condition of Fig. 1.

The seat 36 has an extension part 37 extending from the main body of the seat to the said connection of the seat to bridging part 40 of element 30, and this extension part 37 loosely engages over and around the bridging portion 16 of frame element 10 when the frame elements 10, 12 are in their fully spread condition of Fig. 1. Hence, the said bridging portion 16 of element 10 coacts with bridging part 40 of element 30 in supporting the rear portion of seat 36 in use of the baby walker.

A single element 44 preferably is pivotally mounted on one of the pins 42 for engaging over the bridging part 40 of element 30 and locking the associated parts in operative relationship, as in Fig. 1.

The seat 36 may have conventional leg holes at 31 for accommodating the legs of a baby seated in the baby walker.

As represented in Fig. 3, the walker simply and quickly may be collapsed to generally flat condition. Hook element 44 first will be disengaged following which the upper bridged ends of frame element 10, 12 may be moved toward each other and element 30 swung clockwise about pivots 32, as viewed in Figs. 1 and 3, thereby to carry the seat and extension part 37 clear of frame member 10 and over the bridging portion 24 of frame member 12, and downward into engagement with the fully collapsed frame members 10, 12, as shown in Fig. 3.

Frame elements 10, 12 may be made of any suitable rigid material of any desired cross-sectional shape, but they preferably are formed of tubular metal stock as shown. The upper edge margins of seat 36 conveniently may be provided with the stitched loops 46, 48, 48 and 50 and the loops 46, 48 may be slid along element 30 to locate loop 46 on the bridging part 40 and loops 48, 48 on the opposite legs 38, 38 prior to effecting the pivotal connections at 32. Loop 50 may be arranged on rod 34 prior to mounting of the rod, or the rod may be thrust through one leg portion 22 and through loop 50 on its way to passing through the other leg portion 22.

As best seen in Fig. 4, the leg portions of frame elements 10, 12, below their pivotal connection at 28, may be shaped as desired to provide a desired spread of the wheeled ends of the frame elements, to attain needed stability of the walker in use.

It will be obvious that various changes in details of construction may be made within the scope of the appended claims, and it is intended that the patent shall cover, by suitable expression in the appended claims whatever features of patentable novelty exist in the invention disclosed.

I claim as my invention:

1. A baby walker comprising three generally U-shaped frame members of which the U-arms of one said member extend between and in crossing relation to the U-arms of another said member, means pivotally connecting together the crossing U-arms of said one and said another of the members, the third one of said members having the ends of its U-arms pivotally connected to the opposite U-arms of said one member between the pivot of said crossing U-arms and the bridging portion of said one of the members, seat means of flexible sheet material connected to the U-arms and bridging portion of said third one of the members, and movable with said third member when the latter said member is swung about the said pivotal connections of its U-arms, outwardly extending projections on the opposite U-arms of said another of the members between the bridging portion of the latter said member and the pivot of said crossing U-arms, said third member being swingable over the bridging portion of said another of the members and into engagement with said outwardly extending projections, the bridging portion of said third member engaging back of the U-arms of said second of the members and coacting with said projections to limit the permissible opening spread of said one and said another of the members, the swinging movement of said third member over said bridging portion of said another of the members carrying a portion of the seat material into wrapped relation to the latter said bridging portion.

2. A baby walker as defined in claim 1 wherein a latch element is pivotally mounted on a U-arm of said another of the members in position to be engaged over the bridging portion of said third member when said one and said another of the members are in fully spread condition.

3. A baby walker comprising a pair of inverted generally U-shaped frame members, each having an upper bridging portion extending between generally parallel U-arms which are arranged in crossing relation to the U-arms of the other, means pivotally connecting together the said U-arms at their regions of crossing, a third generally U-shaped member having generally parallel U-arms joined by a bridging portion and having end portions pivotally connected to the U-arms of one of said pair of frame members between the bridging portion thereof and the said pivotal connection of the U-arms, the other of said pair of members having outwardly extending projections on its opposite U-arms between the bridging portion of this member and said pivotal connection of the U-arms, a seat of flexible sheet material connected to said third member and to only one of said pair of members, said third member being adapted to swing over the bridging portion of said other of said pair of members until said third member is stopped against said projections, said pair of members being spreadable about their pivotal connection until the bridging portion of said third member engages back of the U-arms of said other of said pair of members simultaneously with engagement of the U-arms of said third member with said outwardly extending projections.

4. In a collapsible baby walker, a pair of pivotally connected frame members relatively movable about said pivotal connection between a spread seat-supporting position and a collapsed generally flat condition, each said frame member having spaced generally parallel portions connected at their upper ends by a bridging portion, and said generally parallel portions of said pair of frame members being in crossing relation at said pivotal connection, transversely aligned projections on said parallel portions of one of said pair of frame members between the bridging portion thereof and said pivotal connection, a generally U-shaped member having its U-arms pivotally connected at their free ends to said generally parallel portions of the other of said pair of frame members between the bridging portion thereof and said pivotal connection of the pair of frame members, a seat of flexible sheet material secured to said bridging portion and U-arms of said generally U-shaped member, the latter said member being swingable over the bridging portion of said one of said pair of frame members to carry portions of said seat material into wrapped relation to the latter said bridging portion and to engage the bridging portion of said generally U-shaped member back of the said generally parallel portions of said one of said pair of frame members, whereby the latter said bridging portion coacts with said projections in limiting the relative spreading of said pair of frame members.

References Cited in the file of this patent

UNITED STATES PATENTS

| 1,876,111 | Guelpen | Sept. 6, 1932 |
| 2,031,109 | Kersten | Feb. 18, 1936 |

FOREIGN PATENTS

| 925,214 | France | Aug. 28, 1947 |